(12) United States Patent
Ha et al.

(10) Patent No.: US 9,870,644 B2
(45) Date of Patent: Jan. 16, 2018

(54) APPARATUS AND METHOD FOR IMAGE PROCESSING

(75) Inventors: In Woo Ha, Seoul (KR); Tae Hyun Rhee, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1091 days.

(21) Appl. No.: 13/495,378

(22) Filed: Jun. 13, 2012

(65) Prior Publication Data
US 2012/0320039 A1    Dec. 20, 2012

(30) Foreign Application Priority Data

Jun. 14, 2011    (KR) .................... 10-2011-0057471

(51) Int. Cl.
*G06T 15/00*    (2011.01)
*G06T 19/00*    (2011.01)

(52) U.S. Cl.
CPC .................. *G06T 19/006* (2013.01)

(58) Field of Classification Search
CPC combination set(s) only.
See application file for complete search history.

(56) References Cited

U.S. PATENT DOCUMENTS

| | | | |
|---|---|---|---|
| 6,628,298 B1* | 9/2003 | Debevec | 345/632 |
| 7,262,770 B2* | 8/2007 | Sloan et al. | 345/426 |
| 7,408,550 B2* | 8/2008 | Bunnell | 345/426 |
| 7,432,935 B2* | 10/2008 | Keller | 345/581 |
| 7,515,151 B2* | 4/2009 | Keller | 345/426 |
| 7,952,583 B2* | 5/2011 | Waechter et al. | 345/426 |
| 8,248,486 B1* | 8/2012 | Ward | H04N 9/67 348/222.1 |
| 8,436,855 B1* | 5/2013 | Morgan et al. | 345/426 |
| 2003/0108251 A1* | 6/2003 | Kim et al. | 382/285 |

(Continued)

FOREIGN PATENT DOCUMENTS

| | | |
|---|---|---|
| CN | 101354784 A | 1/2009 |
| JP | 2000-30084 | 1/2000 |

(Continued)

OTHER PUBLICATIONS

Madsen, C., and Rune Laursen, "A scalable GPU-based approach to shading and shadowing for photo-realistic real-time augmented reality," International Conference on Computer Graphics Theory and Applications, Mar. 2007.*

(Continued)

*Primary Examiner* — Xiao Wu
*Assistant Examiner* — Mohammad H Akhavannik
(74) *Attorney, Agent, or Firm* — NSIP Law

(57) ABSTRACT

Image processing apparatus and method. A modeling unit may generate a three-dimensional (3D) model corresponding to an actual object from an input color image and an input depth image corresponding to the input color image. A calculator may perform photon-based rendering with respect to an input virtual object and the 3D model based on input light environment information, and may generate a difference image comprising color distortion information occurring by inserting the virtual object into the 3D model. A rendering unit may generate a result image comprising the virtual object by synthesizing the difference image and the input color image.

17 Claims, 9 Drawing Sheets

(56) References Cited

U.S. PATENT DOCUMENTS

| | | | | |
|---|---|---|---|---|
| 2007/0046686 | A1* | 3/2007 | Keller | 345/581 |
| 2008/0018647 | A1* | 1/2008 | Bunnell | 345/426 |
| 2008/0089576 | A1* | 4/2008 | Bushell et al. | 382/154 |
| 2009/0046099 | A1* | 2/2009 | Duca et al. | 345/426 |
| 2009/0102834 | A1* | 4/2009 | Tomite et al. | 345/419 |
| 2009/0128552 | A1* | 5/2009 | Fujiki et al. | 345/419 |
| 2009/0129667 | A1* | 5/2009 | Ho et al. | 382/154 |
| 2009/0254293 | A1* | 10/2009 | Tartaglia et al. | 702/85 |
| 2009/0289940 | A1 | 11/2009 | Kimura et al. | |
| 2010/0134516 | A1* | 6/2010 | Cooper | 345/592 |
| 2011/0012901 | A1* | 1/2011 | Kaplanyan | 345/426 |
| 2012/0114263 | A1* | 5/2012 | Stein et al. | 382/260 |

FOREIGN PATENT DOCUMENTS

| | | |
|---|---|---|
| JP | 2001-52207 | 2/2001 |
| JP | 2001-143105 | 5/2001 |
| JP | 2003-223650 | 8/2003 |
| JP | 2005-293142 | 10/2005 |
| JP | 2009-134681 | 6/2009 |
| KR | 1999-0001299 | 1/1999 |
| KR | 2000-0025350 | 5/2000 |
| KR | 2001-0055957 | 7/2001 |
| KR | 10-2004-0080318 | 9/2004 |
| KR | 10-2004-0090711 | 10/2004 |
| KR | 10-2006-0054874 | 5/2006 |
| KR | 10-2007-0087317 | 8/2007 |
| KR | 10-2008-0102789 | 11/2008 |
| KR | 10-2009-0021778 | 3/2009 |
| KR | 10-2009-0064244 | 6/2009 |
| KR | 10-2009-0085419 | 8/2009 |
| KR | 10-2010-0047563 | 5/2010 |
| KR | 10-2010-0084597 | 7/2010 |
| KR | 10-2010-0128337 | 12/2010 |
| KR | 10-2011-0001333 | 1/2011 |
| KR | 10-2011-0004940 | 1/2011 |
| KR | 10-2011-0008748 | 1/2011 |
| KR | 10-2011-0014795 | 2/2011 |

OTHER PUBLICATIONS

Wang, Jianning, and Manuel M. Oliveira. "A hole-filling strategy for reconstruction of smooth surfaces in range images." XVI Brazilian Symposium on Computer Graphics and Image Processing, 2003, SIBGRAPI 2003, Oct. 2003.*

Adamson, Anders, and Marc Alexa. "Ray tracing point set surfaces." Shape Modeling International, 2003. IEEE, 2003.*

Bendels, G. H. (2007). Methods for 3D geometry processing in the cultural heritage domain (Doctoral dissertation, University of Bonn).*

Daubert, Katja, et al. "Efficient light transport using precomputed visibility." IEEE Computer Graphics and Applications 23.3 (2003): 28-37.*

Paul Debevec, 2008, "Rendering synthetic objects into real scenes: bridging traditional and image-based graphics with global illumination and high dynamic range photography," ACM SIGGRAPH 2008 classes (SIGGRAPH '08), ACM, New York, NY, USA, , Article 32, 10 pages.*

Guennebaud, Gaël, Marcel Germann, and Markus Gross, "Dynamic Sampling and Rendering of Algebraic Point Set Surfaces," Eurographics 2008, vol. 27, No. 3, 2008.*

Ikeuchi, Katsushi, "Modeling from reality," Proceedings Third International Conference on 3-D Digital Imaging and Modeling, 2001, IEEE, 2001.*

Jensen, Henrik Wann, "Global illumination using photon maps," Rendering Techniques' 96, Springer Vienna, 1996, 21-30.*

Jung, Yvonne, et al., "Enhancing X3D for advanced MR appliances," Proceedings of the twelfth international conference on 3D web technology, ACM, 2007.*

Karlsson, Johan, and Mikael Selegård, "Rendering Realistic Augmented Objects Using a Image Based Lighting Approach," (2005).*

Krüger, Jens, Kai Bürger, and Rüdiger Westermann, "Interactive Screen-Space Accurate Photon Tracing on GPUs," Rendering Techniques 2006 (2006): 17th.*

Larsen, Bent Dalgaard, and Niels Jørgen Christensen, "Simulating photon mapping for real-time applications," (2004).*

Lehtinen, Jaakko, et al., "Meshless Finite Elements for Hierarchical Global Illumination," (2007).*

Levin, David, "Mesh-independent surface interpolation," Geometric modeling for scientific visualization, Springer Berlin Heidelberg, 2004.*

McCool, Michael D., and Wolfgang Heidrich, "Texture shaders," Proceedings of the ACM SIGGRAPH/EUROGRAPHICS workshop on Graphics hardware, ACM, 1999.*

Supan, Peter, Ines Stuppacher, and Michael Haller, "Image Based Shadowing in Real-Time Augmented Reality," IJVR 5.3 (2006): 1-7.*

Wald, Ingo, et al., "Interactive global illumination," Technical Report TR-2002-02, Computer Graphics Group, Saarland University, 2002.*

Grosch, Thorsten. "Differential photon mapping: Consistent augmentation of photographs with correction of all light paths." Eurographics. 2005.*

Hattenberger, Timothy J., et al. "A psychophysical investigation of global illumination algorithms used in augmented reality." ACM Transactions on Applied Perception (TAP) 6.1 (2009): 2.*

Chinese Office Action dated Nov. 24, 2015 in counterpart Chinese Application No. 201210195561.2. (11 pages in Chinese).

* cited by examiner

APPARATUS AND METHOD FOR IMAGE PROCESSING

CROSS-REFERENCE TO RELATED APPLICATIONS

This application claims the priority benefit of Korean Patent Application No. 10-2011-0057471, filed on Jun. 14, 2011, in the Korean Intellectual Property Office, the disclosure of which is incorporated herein by reference.

BACKGROUND

1. Field

Example embodiments of the following description relate to an image processing apparatus and method, and more particularly, to an image processing apparatus and method that may generate a real color image having an excellent reality by including a virtual object in the real color image.

2. Description of the Related Art

With development in movie technology using computer graphics, the necessity of image processing to synthesize a real color image and a virtual object has been increasing and a high quality synthesized result image is required.

However, in the conventional art, there are some constraints on realistically expressing the virtual object in the real color image. For example, an image based mixture expression process of synthesizing the real color image with an image that is rendered in advance with respect to the virtual object has some difficulty in realistically expressing various optical effects due to lack of information about actual objects within the real color image.

For example, the effect of illumination light that is reflected or refracted by objects may not harmonize an actual object and a virtual object

SUMMARY

The foregoing and/or other aspects are achieved by providing an image processing apparatus, including a modeling unit to generate a three-dimensional (3D) model corresponding to an actual object from an input color image and an input depth image corresponding to the input color image; a calculator to perform photon-based rendering with respect to an input virtual object and the 3D model based on input light environment information, and to generate a difference image including color distortion information occurring by inserting the virtual object into the 3D model; and a rendering unit to generate a result image including the virtual object by synthesizing the difference image and the input color image.

The calculator may include an illumination map calculator to generate an illumination map of the 3D model corresponding to the actual object by performing rendering based on the input light environment information with assuming the input depth image as a constant material; and a material map calculator to generate a material map of the 3D model by performing a pixel-by-pixel divide operation with respect to the illumination map in the input color image.

The illumination map calculator may remove noise in the input depth image by performing at least one operation of low band pass filtering and moving least square (MLS), with respect to the input depth image, and then may generate the illumination map.

The illumination map calculator may generate the illumination map of the 3D model corresponding to the actual object by performing rendering based on the input light environment information with assuming, as a constant material, a smooth surface point cloud that is generated as a result of the at least one operation.

The calculator may further include an irradiance map calculator to perform photon-based rendering with respect to the input virtual object and the 3D model based on the input light environment information, and to generate an irradiance map of the 3D model based on a difference between a photon and an anti-photon that are calculated as a result of the photon-based rendering; and a difference image calculator to generate the difference image by performing a pixel-by-pixel multiply operation with respect to the irradiance map and the material map.

The foregoing and/or other aspects are achieved by providing an image processing apparatus, including a modeling unit to generate a 3D model from an input color image and an input depth image corresponding to the input color image; a calculator to generate a difference image between a first image and a second image, the first image acquired by rendering the 3D model at a camera view based on input light environment information and the second image acquired by rendering the 3D model and an input virtual object at the camera view based on the input light environment information; and a rendering unit to generate a result image including the virtual object by synthesizing the difference image and the input color image.

The image processing apparatus may further include, wherein when at least one of the first image and the second image is rendered, the calculator uses at least one of photon-based rendering, ray tracing, and a radiosity process.

The foregoing and/or other aspects are achieved by providing an image processing apparatus, including an illumination map calculator to generate an illumination map of an object associated with an input depth image by performing rendering based on input light environment information with assuming the input depth image as a constant material; and a material map calculator to generate a material map of the object by performing a pixel-by-pixel divide operation, with respect to the illumination map in the input color image.

The foregoing and/or other aspects are achieved by providing an image processing method, including generating a 3D model corresponding to an actual object from an input color image and an input depth image corresponding to the input color image; performing photon-based rendering with respect to an input virtual object and the 3D model based on input light environment information, to generate a difference image including color distortion information occurring by inserting the virtual object into the 3D model; and generating a result image including the virtual object by synthesizing the difference image and the input color image.

The foregoing and/or other aspects are achieved by providing an image processing method, including generating a 3D model from an input color image and an input depth image corresponding to the input color image; generating a difference image between a first image and a second image, the first image acquired by rendering the 3D model at a camera view based on input light environment information and the second image acquired by rendering the 3D model and an input virtual object at the camera view based on the input light environment information; and generating a result image including the virtual object by synthesizing the difference image and the input color image.

The example embodiments may also include an image processing apparatus and method that may generate a result image having an excellent reality when rendering an image in which a virtual object is included in a color image of an actual object. Also, the quality of image processing may be significantly enhanced compared to image processing resources, and a material map may be readily generated from an input color image and an input depth image based on light environment information.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
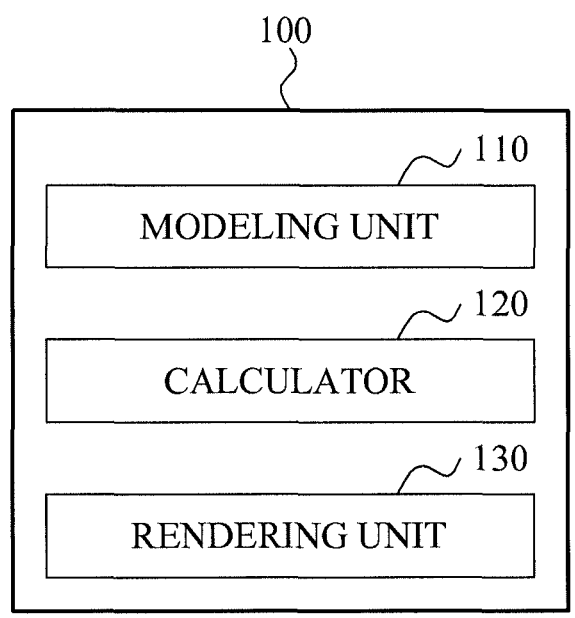
FIG. 1 illustrates an image processing apparatus according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an image processing apparatus 100 according to example embodiments.

A modeling unit 110 of the image processing apparatus 100 may generate a three-dimensional (3D) model corresponding to an input color image and an input depth image.

The input color image and the input depth image may match each other. When the input color image and the input depth image do not match, preprocessing may be performed to match the input color image and the input depth image.

The image processing apparatus 100 may realistically include a virtual object in the input color image by including the virtual object in the 3D model.

The modeling unit 110 may generate the 3D model in a point cloud form using the input color image and the input depth image. In some embodiments, the 3D model may be generated after performing low pass filtering and/or moving least square (MLS) in order to remove noise in the input depth image. The 3D model in the point cloud form is only an example, and thus, other embodiments of generating a mesh based 3D model and the like may be applied.

An operation of the modeling unit 110 will be further described with reference to FIG. 3.

Information input to the image processing apparatus 100 may include light environment information that affects the 3D model. The light environment information may include a position of light, a direction thereof, energy thereof, and the like, that are to be considered when performing rendering by synthesizing a virtual object and the 3D model.

A calculator 120 of the image processing apparatus 100 may calculate a color difference occurring when the virtual object is considered and when the virtual object is not considered, using the input color image, the input depth image, and the input light environment information.

The color difference may be understood to include a distortion, or an increment or a decrement in a color value, with respect to each of the pixels. Since the color difference can be calculated with respect to each of the pixels constituting the whole color image, an image including such color difference information may be referred to as a color difference image or a difference image.

The calculator 120 may generate an illumination map corresponding to the input depth image by assuming a constant material with respect to each of pixels constituting the input depth image, ignoring a texture of material, and then performing rendering based on only the input light environment information.

The calculator 120 may generate a material map corresponding to each of the objects within the input color image by performing a pixel-by-pixel divide operation with respect to the illumination map in the input color image.

In an example embodiment, the material map may include texture information, such as, color information of each of the objects within the input color image and the like. Since the 3D model corresponds to the input color image, the material map may be understood to correspond to the 3D model.

The calculator 120 may perform photon-based rendering with respect to the input virtual object and the 3D model based on the input light environment information, and may generate an irradiance map of the 3D model based on a difference between a photon and an anti-photon that are calculated as a result of the photon-based rendering.

The irradiance map may correspond to information about an amount of light received by an object portion corresponding to each pixel, for example, a point or a mesh in a current light environment. Therefore, when the irradiance map is used for a material of the object portion, for example, color information, the irradiance map may be used to calculate an optical color value observed at a camera view to render a result image.

The calculator 120 may generate the difference image indicating a color difference between a case where the virtual object is included in the 3D model and a case where the virtual object is not included in the 3D model, using the irradiance map and the material map.

Photon-based rendering may be performed to generate the difference image, which will be further described with reference to FIG. 2 through FIG. 7.

A rendering unit 130 of the image processing apparatus 100 may generate a result image including the virtual object by synthesizing the difference image and the input color image. The generated result image may have an excellent reality since the virtual object is naturally included in the input color image. It will be further described below.

Figure 2:
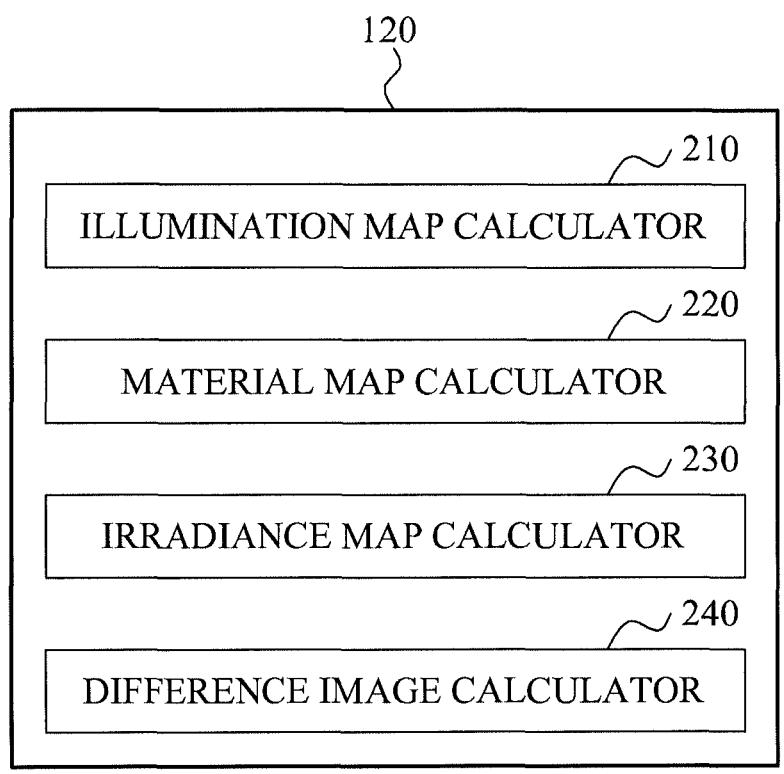
FIG. 2 illustrates a configuration of a calculator included in the image processing apparatus of FIG. 1.

FIG. 2 illustrates a configuration of the calculator 120 included in the image processing apparatus 100 of FIG. 1.

Referring to FIG. 2, the calculator 120 of the image processing apparatus 100 may include an illumination map calculator 210, a material map calculator 220, an irradiance map calculator 230, and a difference image calculator 240.

As described above, the calculator 120 may generate a difference image indicating a color difference that occurs when the virtual object is considered and when the virtual object is not considered, using the input color image, the input depth image, and input light environment information.

To synthesize the virtual object with the input color image photographed from the actual object, there is a need to realistically express the optical effects, for example, the reflection of light, the refraction of light, and the like, which occurs when the virtual object is inserted between actual objects within the input color image.

The optical effects may be understood as distortion or a change in color values of pixels within the input color image. The difference image generated by the calculator 120 may correspond to a result image that is obtained by calculating the distortion or the change in the color values for each pixel.

The input depth image indicates information about a distance between each of the actual objects and a depth camera used to obtain the input depth image, and thus, may not provide texture information including color information of the actual objects.

For example, the input depth image may have a noise characteristic for many reasons. The reasons may include noise occurring in a sensor end of the depth camera, depth folding, a color value of an actual object, an infrared ray existing in an external environment, and the like.

Instead of using the input depth image having the noise characteristic as is, the illumination map calculator 210 or at least one of the constituent elements of the image processing apparatus 100 may generate actual objects in a smooth surface point cloud form and then use the same by employing, as preprocessing, an image processing process such as noise filtering, depth folding removal, MLS, and the like. Hereinafter, even though not particularly mentioned, the present disclosure needs to be understood based on embodiments of performing the above preprocessing process and other embodiments of not performing the preprocessing process.

The illumination map calculator 210 may assume a constant material with respect to each of the pixels constituting the input depth image, by ignoring a texture difference of a material, for example, a color of the material.

An illumination map corresponding to the input depth image may be generated by rendering a 3D model extracted from the input depth image based on only input light environment information.

The illumination map may include information about light of a color that is transferred to the actual objects within the 3D model in the light environment, a direction thereof, intensity thereof, and the like. Accordingly, a color value, based on the light environment, in which a color value of an actual object material, itself, is considered, may be included in the illumination map.

The material map calculator 220 may perform a divide operation with respect to the illumination map from the input color image. When it is assumed that the input color image and the input depth image are pixel-by-pixel matched, the divide operation may be a simple pixel-by-pixel color value divide operation.

The material map may be generated by removing the affect of the light environment in a color value of each of the pixels constituting the input depth image. The material map may include material color information of each of the actual objects within the 3D model in which the light environment is ignored.

The irradiance map calculator 230 may insert the input virtual object into a predetermined position of the 3D model and perform photon-based rendering based on the light environment information. The photon-based rendering will be further described with reference to FIG. 5.

When the photon-based rendering is performed, an irradiance map of when the virtual object is inserted into the 3D model may be generated.

The irradiance map may include information about an amount of light that is received from the light environment to each pixel or an object portion corresponding to each pixel.

The irradiance map of before the virtual object is inserted may correspond to the illumination map. The irradiance map may indicate an irradiance received in the light environment by inserting the virtual object into the 3D model.

The difference image calculator 240 may generate the difference image by multiplying the irradiance by a color value of the material.

The rendering unit 130 of the image processing apparatus 100 may generate the result image including the virtual object in the actual image by synthesizing the difference image with the input color image.

Figure 3:
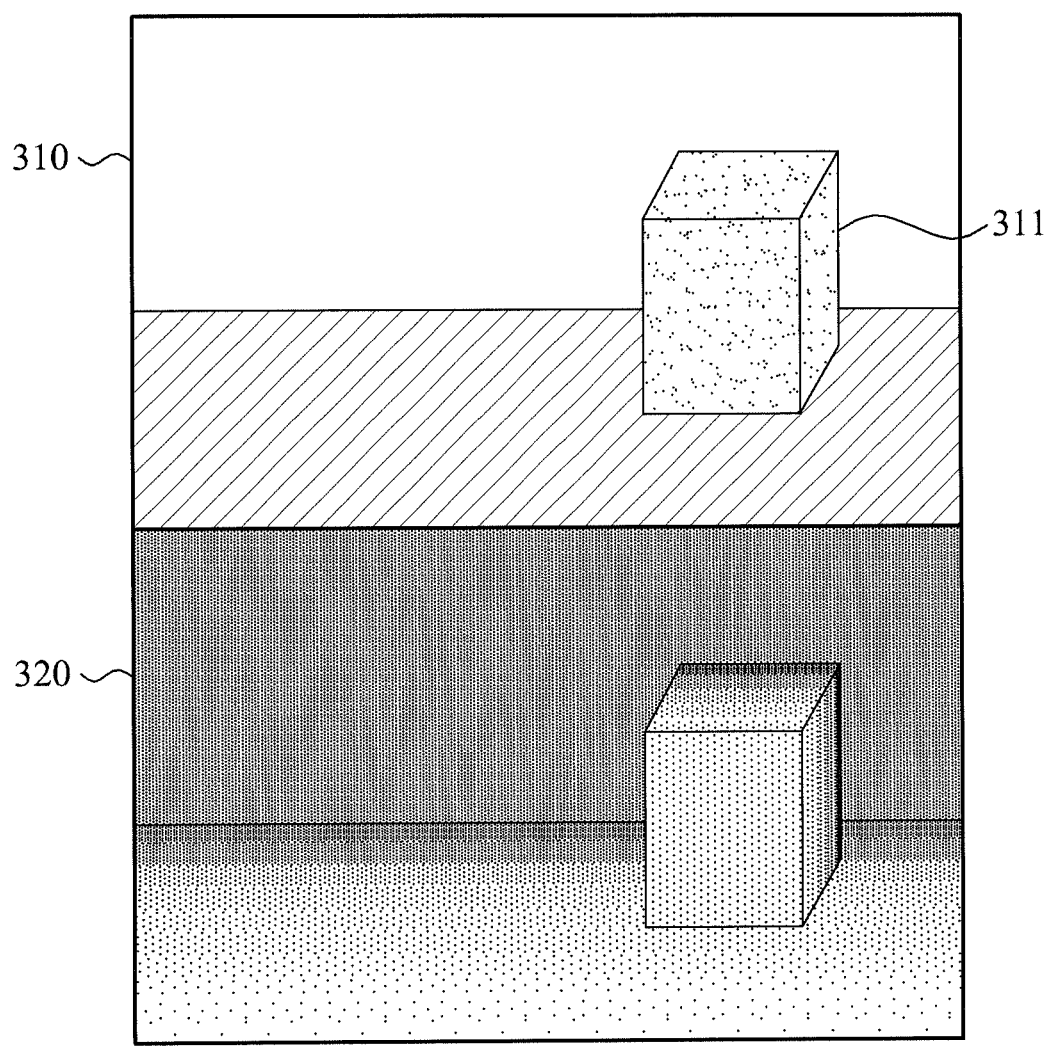
FIG. 3 illustrates an input color image and an input depth image according to example embodiments.

FIG. 3 illustrates an input color image 310 and an input depth image 320 according to example embodiments.

The input color image 310 may include color information of an actual object 311 and color information of a background.

The input depth image 320 may include depth information that matches the input color image 310. When the input color image 310 and the input depth image 320 do not match, a matching process, for example, warping, scaling, and the like may be performed as preprocessing.

To enhance the quality of the input depth image 320, filtering, MLS, and the like may be performed as preprocessing.

The modeling unit 110 of the image processing apparatus 100 may generate the 3D model using the input color image 310 and the input depth image 320. The generated 3D model may be a point cloud model, a mesh based model, and the like.

Figure 4:
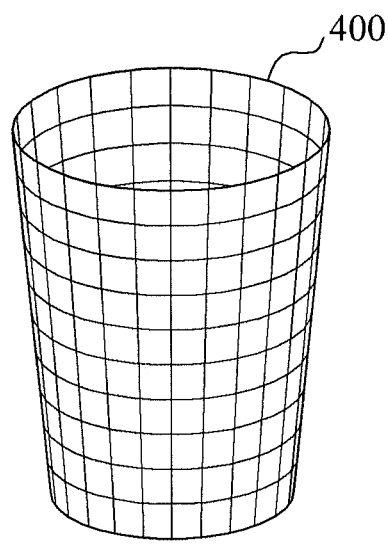
FIG. 4 illustrates a virtual object according to example embodiments.

FIG. 4 illustrates a virtual object 400 according to example embodiments.

When the virtual object 400 is inputted, geometry information and material or texture information of the virtual object 400 may be provided to the image processing apparatus 100.

Hereinafter, a process of generating a result image having an excellent reality by synthesizing the virtual 400 with the input color image 310 of FIG. 3 will be described with reference to FIG. 5.

Figure 5:
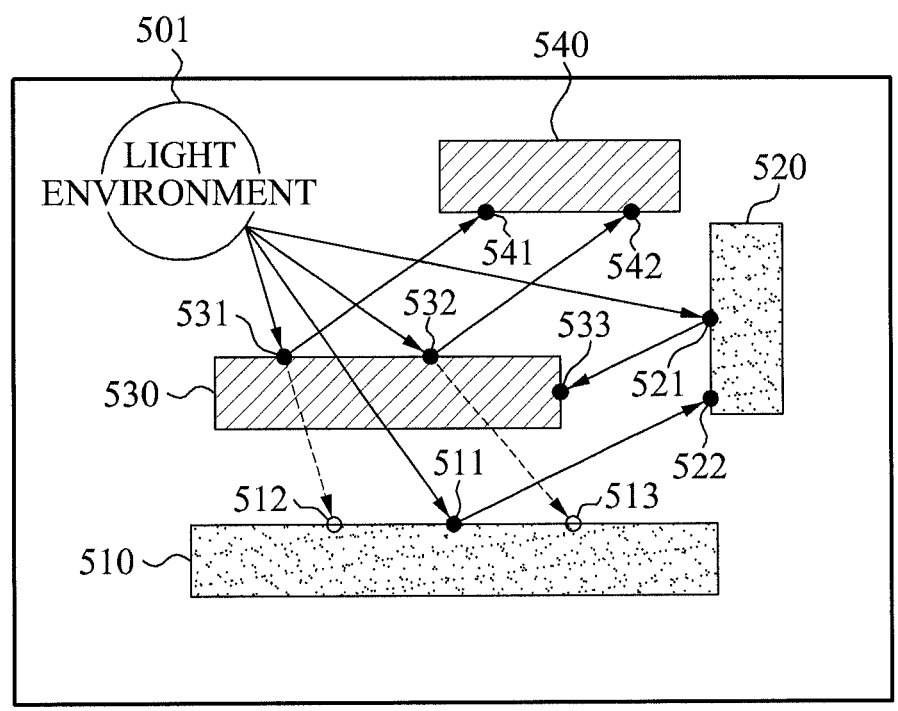
FIG. 5 illustrates a process of performing photon-based rendering according to example embodiments.

FIG. 5 illustrates a process 500 of performing photon-based rendering according to example embodiments.

Photon-based rendering may be performed using a process of tracking a progress path of photons radiated in an input light environment 501.

In a case where a photon 531 is radiated in the light environment 501 and collides with a virtual object 530, if the virtual object 530 had been absent, the photon 531 might have collided with an original actual object 510. Therefore, a path of the photon 531 is changed due to the presence of the virtual object 530. A point at which the photon 531 might have collided with the actual object 510, if the virtual object 530 had been absent, is separately calculated and is expressed as an anti-photon 512.

In this example, the term "photon" may not be the same as a photon of light in the actual physics, and may be information that is used to count irradiance within a 3D model including objects. A point having more photons may be regarded to have the greater irradiance.

Also, the term "anti-photon" may be understood as a conceptual photon induced to calculate an amount of photons that should have been received by an actual object when a virtual object is absent, however, have not been received since a progress path of a photon is changed due to the virtual object.

As described above, the photon 531 may migrate along a path changed due to insertion of the virtual object 530. The anti-photon 512 is generated at an intersecting point with the actual object 510 along an original path. The photon 531 is reflected from the virtual object 530 to thereby progress along a new path and to intersect with another virtual object 540. As a result, a new photon 541 is generated. Since the progress path of the photon 531 is changed due to insertion of the virtual object 530, the anti-photon 512 and the photon 541 are generated.

A progress path of a photon 532 is also changed whereby an anti-photon 513 is generated in an original progress path. A photon 542 is generated in a new path.

A photon 511 collides with the actual object 510 and is reflected from the actual object without colliding with the virtual object 530. Therefore, a photon 522 is generated in an actual object 520. During the above process, a progress path of light may not be affected by insertion of the virtual object 530.

Light radiated in the light environment 501 may collide with the actual object 520, thereby generating a photon 521 and a photon 533 of the virtual object 530. Although not illustrated, the photon 533 is newly generated due to insertion of the virtual object 530. Due to the photon 533, newly generated in the path of the photon 521, another anti-photon (not shown) may be generated in the actual object 510.

The above process of calculating photons and anti-photons with respect to the whole 3D model may be understood as photon-based rendering. The photon-based rendering may use only a predetermined level, for example, only one time reflection in a number of reflections and the like.

Figure 6:
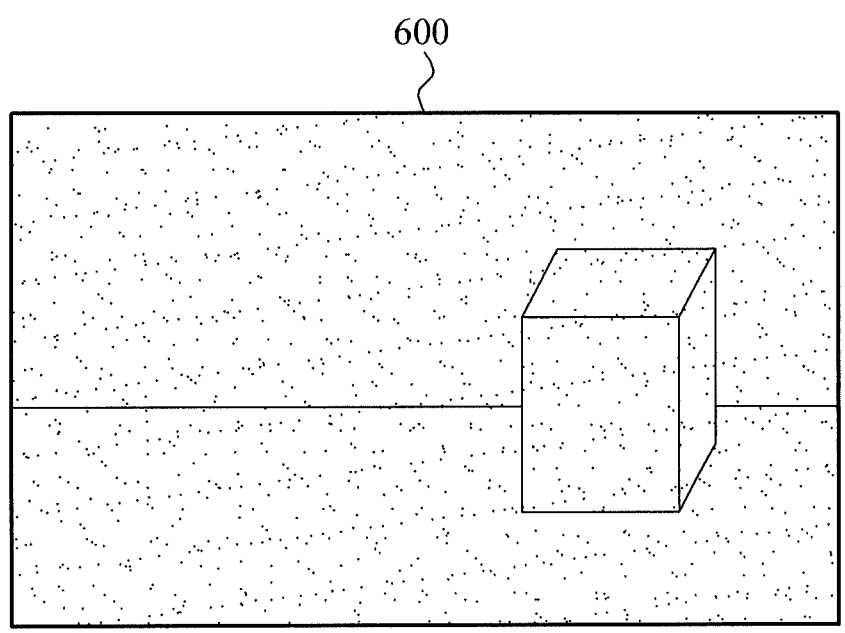
FIG. 6 illustrates an illumination map according to example embodiments.

FIG. 6 illustrates an illumination map 600 according to example embodiments.

The illumination map calculator 220 may perform rendering in a light environment, with assuming, as a constant material, the whole point clouds verified from the input depth image 320. Rendering may be performed based on the light environment information. The illumination map 600 indicating a level of the light environment that changes a color value with respect to each object may be generated.

Figure 7:
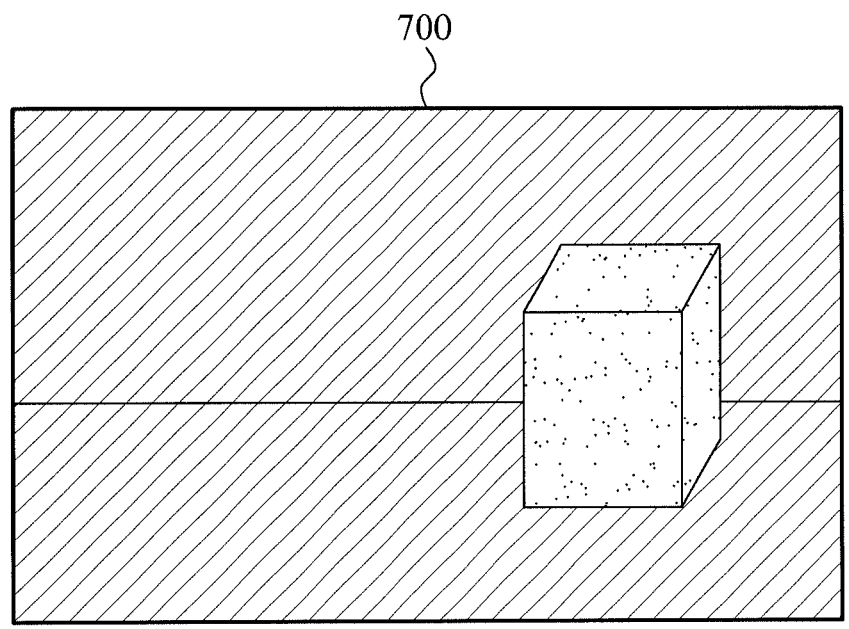
FIG. 7 illustrates a material map according to example embodiments.

FIG. 7 illustrates a material map 700 according to example embodiments.

As described above, the material map calculator 220 may generate the material map 700 by performing a pixel-by-pixel divide operation with respect to the illumination map 600 in the input color image 310.

Material information of each object may be included in the material map 700. For example, color information may be included in the material map 700. In the example of FIG. 7, a color of an object portion may be distinguished from a background color.

When the material map 700 is generated, the difference image calculator 240 may generate a difference image (not shown) by multiplying, pixel-by-pixel, an irradiance map and the material map 700, with respect to the 3D model and the virtual object calculated by the irradiance map calculator 230.

Figure 8:
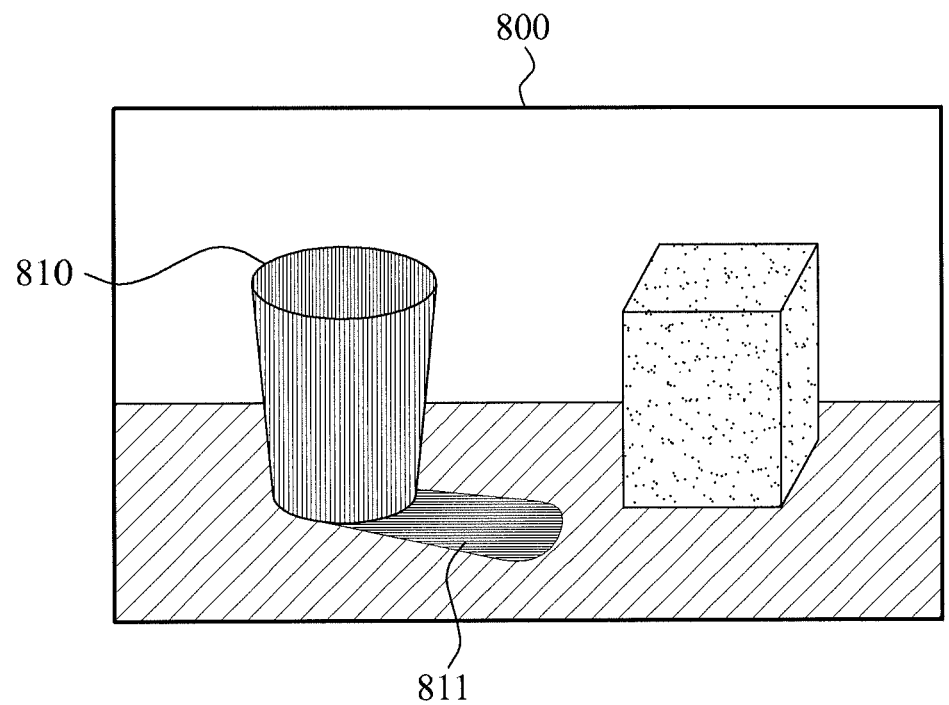
FIG. 8 illustrates a rendering result image according to example embodiments.

FIG. 8 illustrates a rendering result image 800 according to example embodiments.

The rendering unit 130 may generate the result image 800 by synthesizing the difference image and the input color image 310.

An inserted virtual object portion 810 is expressed in the result image 800. Also, the optical effects, for example, a distortion and/or a change in a color value of the input color image 310, such as a shadow portion 811 and the like is realistically expressed in the result image 800.

Images used for the above rendering process may be high dynamic range (HDR) images. Accordingly, a process of converting a red, green, blue (RGB) value of a low dynamic range (LDR) image acquired using a general color image, for example, one integer from 0 to 255, to an RGB value that is a predetermined float real number, for example, a real number value between 0 and 1 may be required. Detailed description related thereto will be omitted here.

Also, a position of a virtual object to be inserted into the 3D model may be determined based on predetermined arrangement information that is received by the image processing apparatus 100. In this instance, a marker tracking process and the like may be employed.

Figure 9:
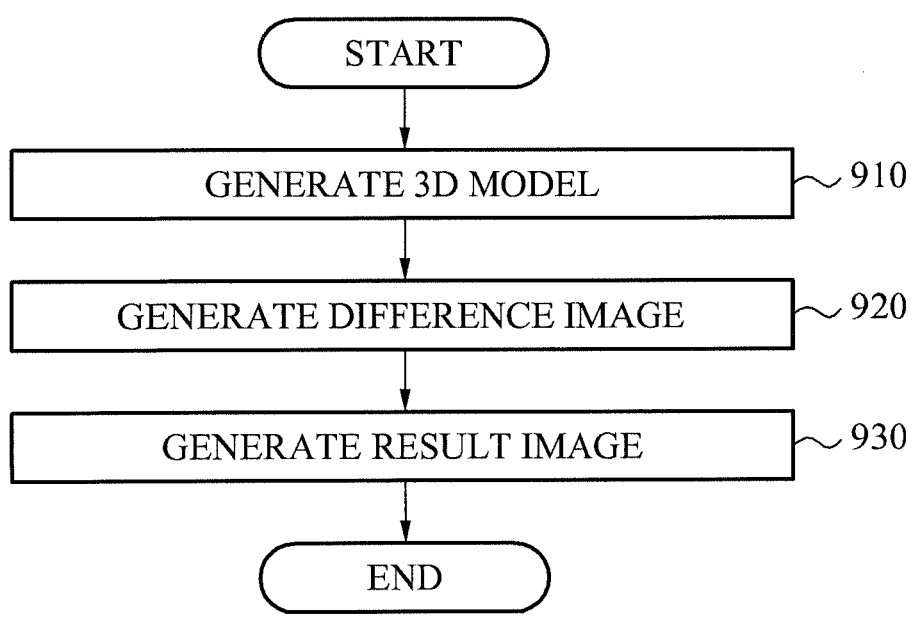
FIG. 9 illustrates an image processing method according to example embodiments.

FIG. 9 illustrates an image processing method according to example embodiments.

In operation 910, the modeling unit 110 of the image processing apparatus 100 may generate a 3D model corresponding to an input color image and an input depth image. The 3D model generating process is described above with reference to FIG. 1 and FIG. 3.

In operation 920, the calculator of the image processing apparatus 100 may generate a difference image including color change information that may occur when a virtual object is inserted.

According to example embodiments, operation 920 may include an operation of assuming, as a constant material, an object portion corresponding to each of pixels constituting the input depth image and then generating an illumination map rendered based on only an input light environment. The illumination map generating process is described above with reference to FIG. 6.

Operation 920 may include an operation of generating, by the material map calculator 220, a material map by performing a pixel-by-pixel divide operation with respect to the illumination map from the input color image, and may include an operation of generating, by the irradiance map calculator 230, an irradiance map. The material map calculating process is described above with reference to FIG. 7 and the irradiance map generating process is described above with reference to FIG. 5.

In operation 930, the rendering unit 130 of the image processing apparatus 100 may generate a result image in which the virtual object is included in the actual object by synthesizing the difference image and the input color image. Operation 930 is described above with reference to FIG. 8.

The image processing method according to the above-described embodiments may be recorded in non-transitory computer-readable media including program instructions to implement various operations embodied by a computer. The embodiments can be implemented in computing hardware and/or software, such as (in a non-limiting example) any computer that can store, retrieve, process and/or output data and/or communicate with other computers. The results produced can be displayed on a display of the computing hardware. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Moreover, the embodiments of the image processing apparatus may include one or more processors to execute at least one of the above-described units and methods.

Further, according to an aspect of the embodiments, any combinations of the described features, functions and/or operations can be provided.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing apparatus, comprising:
    a modeling processor to generate a three-dimensional (3D) model corresponding to an actual object using an input color image and an input depth image corresponding to the input color image;
    an illumination map calculating processor to generate an illumination map of the 3D model corresponding to the actual object by performing rendering based on the input light environment information with assuming the input depth image as a constant material; and
    a material map calculating processor to generate a material map of the 3D model by performing a pixel-by-pixel divide operation with respect to the illumination map in the input color image and distinguish a color of the actual object from a background color;
    a calculating processor to perform photon-based rendering with respect to an input virtual object and the 3D model based on the input light environment information, to generate an irradiance map comprising illumination difference occurring by inserting the virtual object into the 3D model, and to generate a difference image comprising color distortion information in RGB color values of respective pixels occurring by inserting the virtual object into the 3D model using the irradiance map; and
    a rendering processor to generate a result image comprising the virtual object by synthesizing the difference image and the input color image.

2. The image processing apparatus of claim 1, wherein the illumination map calculating processor removes noise in the input depth image by performing at least one operation of low band pass filtering and moving least square (MLS) with respect to the input depth image and then generates the illumination map.

3. The image processing apparatus of claim 2, wherein the illumination map calculating processor generates the illumination map of the 3D model corresponding to the actual object by performing rendering based on the input light environment information with assuming, as a constant material, a smooth surface point cloud that is generated as a result of the at least one operation.

4. The image processing apparatus of claim 1, wherein the calculator further comprises:
    an irradiance map calculating processor to perform photon-based rendering with respect to the input virtual object and the 3D model based on the input light environment information, and to generate the irradiance map of the 3D model based on the difference between the photon and the anti-photon that are calculated as a result of the photon-based rendering; and
    a difference image calculating processor to generate the difference image by performing a pixel-by-pixel multiply operation with respect to the irradiance map and the material map.

5. An image processing apparatus, comprising:
    a modeling processor to generate a three-dimensional (3D) model using an input color image and an input depth image corresponding to the input color image;
    an illumination map calculating processor to generate an illumination map of the 3D model corresponding to an actual object by performing rendering based on the input light environment information with assuming the input depth image as a constant material; and
    a material map calculating processor to generate a material map of the 3D model by performing a pixel-by-pixel divide operation with respect to the illumination map in the input color image and distinguish a color of the actual object from a background color;
    a calculating processor to perform photon-based rendering with respect to an input virtual object and the 3D model based on the input light environment information, to generate an irradiance map comprising illumination difference occurring by inserting the virtual object into the 3D model, and to generate a difference image comprising color distortion information in RGB color values of respective pixels between a first image and a second image, the first image acquired by rendering the 3D model at a camera view based on the input light environment information and the second image using the irradiance map acquired by rendering the 3D model and an input virtual object at the camera view based on the input light environment information; and
    a rendering processor to generate a result image comprising the virtual object by synthesizing the difference image and the input color image.

6. The image processing apparatus of claim 5, wherein when at least one of the first image and the second image is rendered, the calculating processor uses at least one of photon-based rendering, ray tracing, and a radiosity process.

7. An image processing apparatus, comprising:
    a modeling processor to generate a three-dimensional (3D) model corresponding to an actual object using an input color image and a corresponding input depth image;
    an illumination map calculating processor to generate an illumination map of an object associated with an input depth image by performing rendering based on input light environment information with assuming the input depth image as a constant material, perform photon-based rendering with respect to an input virtual object and the 3D model based on the input light environment information, and to generate an irradiance map comprising illumination difference occurring by inserting the virtual object into the 3D model;

a material map calculating processor to generate a material map of the object by performing a pixel-by-pixel divide operation with respect to the illumination map in the input color image and distinguish a color of the actual object from a background color; and a difference image calculating processor configured to generate a difference image comprising color distortion information in RGB color values of respective pixels occurring by inserting the virtual object into the 3D model; and a rendering processor to generate a result image comprising the virtual object by synthesizing the difference image and the input color image.

8. An image processing method, comprising:

generating a three-dimensional (3D) model corresponding to an actual object using an input color image and an input depth image corresponding to the input color image;

generating an illumination map of the 3D model corresponding to the actual object by performing rendering based on the input light environment information with assuming the input depth image as a constant material;

generating a material map of the 3D model by performing a pixel-by-pixel divide operation with respect to the illumination map in the input color image and distinguishing a color of the actual object from a background color;

performing photon-based rendering with respect to an input virtual object and the 3D model based on the input light environment information, to generate an irradiance map comprising illumination difference occurring by inserting the virtual object into the 3D model, and to generate a difference image comprising color distortion information in RGB color values of respective pixels occurring by inserting the virtual object into the 3D model using the irradiance map;

generating a result image comprising the virtual object by synthesizing the difference image and the input color image.

9. The method of claim 8, wherein the generating of the illumination map comprises removing noise in the input depth image by performing at least one operation of low band pass filtering and moving least square (MLS) with respect to the input depth image and then generating the illumination map.

10. The method of claim 9, wherein the generating of the illumination map comprises generating the illumination map of the 3D model corresponding to the actual object by performing rendering based on the input light environment information with assuming, as a constant material, a smooth surface point cloud that is generated as a result of the at least one operation.

11. The method of claim 8, wherein the generating of the difference image further comprises:

performing photon-based rendering with respect to the input virtual object and the 3D model based on the input light environment information, to generate an irradiance map of the 3D model based on a difference between a photon and an anti-photon that are calculated as a result of the photon-based rendering; and generating the difference image by performing a pixel-by-pixel multiply operation with respect to the irradiance map and the material map.

12. An image processing method, comprising:

generating a three-dimensional (3D) model using an input color image and an input depth image corresponding to the input color image;

generating an illumination map of the 3D model corresponding to an actual object by performing rendering based on the input light environment information with assuming the input depth image as a constant material; and generating a material map of the 3D model by performing a pixel-by-pixel divide operating with respect to the illumination map in the input color image and distinguishing a color of the actual object from a background color;

performing photon-based rendering with respect to an input virtual object and the 3D model based on the input light environment information;

generating an irradiance map comprising illumination difference occurring by inserting the virtual object into the 3D model;

generating a difference image comprising color distortion information in RGB color values of respective pixels between a first image and a second image using the irradiance map, the first image acquired by rendering the 3D model at a camera view based on input light environment information and the second image acquired by rendering the 3D model and an input virtual object at the camera view based on the input light environment information, and to generate an irradiance map of the 3D model based on a difference between a photon and an anti-photon; and generating a result image comprising the virtual object by synthesizing the difference image and the input color image.

13. The image processing method of claim 12, wherein at least one of the first image and the second image is rendered using at least one of photon-based rendering, ray tracing, and a radiosity process.

14. A non-transitory computer-readable medium comprising a program for instructing a computer to perform an image processing method including:

generating a three-dimensional (3D) model corresponding to an actual object using an input color image and an input depth image corresponding to the input color image;

generating an illumination map of the 3D model corresponding to the actual object by performing rendering based on the input light environment information with assuming the input depth image as a constant material; and generating a material map of the 3D mode by performing a pixel-by-pixel divide operation with respect to the illumination map in the input color image and distinguishing a color of the actual object from a background color;

performing photon-based rendering with respect to an input virtual object and the 3D model based on the input light environment information, to generate an irradiance map comprising illumination difference occurring by inserting the virtual object into the 3D model, and to generate a difference image comprising color distortion information in RGB color values of respective pixels occurring by inserting the virtual object into the 3D model using the irradiance map; and generating a result image comprising the virtual object by synthesizing the difference image and the input color image.

15. The non-transitory computer-readable medium of claim 14, wherein the generating of the illumination map comprises removing noise in the input depth image by performing at least one operation of low band pass filtering and moving least square (MLS) with respect to the input depth image and then generating the illumination map.

16. The non-transitory computer-readable medium of claim 14, wherein the generating of the different image further comprises:
   performing photon-based rendering with respect to the input virtual object and the 3D model based on the input light environment information, to generate an irradiance map of the 3D model based on a difference between a photon and an anti-photon that are calculated as a result of the photon-based rendering; and
   generating the difference image by performing a pixel-by-pixel multiply operation with respect to the irradiance map and the material map.

17. A non-transitory computer-readable medium comprising a program for instructing a computer to perform an image processing method including:
   generating a three-dimensional (3D) model using an input color image and an input depth image corresponding to the input color image;
   generating an illumination map of the 3D model corresponding to an actual object by performing rendering based on the input light environment information with assuming the input depth image as a constant material,
   generating a material map of the 3D model by performing a pixel-by-pixel divide operation with respect to the illumination map in the input color image and distinguishing a color of the actual object from a background color;
   performing photon-based rendering with respect to an input virtual object and the 3D model based on the input light environment information;
   generating an irradiance map comprising illumination difference occurring by inserting the virtual object into the 3D model;
   generating a difference image comprising color distortion information in RGB color values of respective pixels between a first image and a second image using the irradiance map, the first image acquired by rendering the 3D model at a camera view based on the input light environment information and the second image acquired by rendering the 3D model and an input virtual object at the camera view based on the input light environment information; and
   generating a result image comprising the virtual object by synthesizing the difference image and the input color image.

* * * * *